United States Patent
Spanke et al.

(10) Patent No.: US 11,206,271 B2
(45) Date of Patent: Dec. 21, 2021

(54) METHOD FOR ENSURING THE AUTHENTICITY OF A FIELD DEVICE

(71) Applicant: Endress+Hauser SE+Co. KG, Maulburg (DE)

(72) Inventors: Dietmar Spanke, Steinen (DE); Nikolai Fink, Aesch (CH); Michael Gunzert, Karlsruhe (DE); Ulrich Kaiser, Basel (CH); Dimitri Mousko, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 276 days.

(21) Appl. No.: 16/337,587

(22) PCT Filed: Aug. 28, 2017

(86) PCT No.: PCT/EP2017/071539
§ 371 (c)(1),
(2) Date: Mar. 28, 2019

(87) PCT Pub. No.: WO2018/059852
PCT Pub. Date: Apr. 5, 2018

(65) Prior Publication Data
US 2020/0036728 A1    Jan. 30, 2020

(30) Foreign Application Priority Data
Sep. 30, 2016 (DE) .................... 10 2016 118 610.4

(51) Int. Cl.
*H04L 29/06* (2006.01)
*G06Q 20/06* (2012.01)
(Continued)

(52) U.S. Cl.
CPC ........... *H04L 63/12* (2013.01); *G06Q 20/065* (2013.01); *H04L 63/08* (2013.01); *H04L 67/125* (2013.01); *H04W 12/069* (2021.01)

(58) Field of Classification Search
CPC ....... H04L 63/12; H04L 63/08; H04L 67/125; H04L 67/104; H04L 67/12; H04W 12/069; H04W 4/70; G06Q 20/065; G06F 21/64
See application file for complete search history.

(56) References Cited

U.S. PATENT DOCUMENTS 9,747,434 B1 * 8/2017 Avital .................... H04L 67/02
2009/0077387 A1 3/2009 Craft
(Continued)

OTHER PUBLICATIONS

Search Report for German Patent Application No. 10 2016 118 610.4, German Patent Office, dated Jul. 4, 2017, 14 pp.
(Continued)

*Primary Examiner* — Khoi V Le
(74) *Attorney, Agent, or Firm* — Kelly J. Smith; Endress+Hauser (USA) Holding Inc.

(57) ABSTRACT

The present disclosure relates to a method for ensuring the authenticity of a field device. The method includes a step of assigning a unique authentic identification feature to the field device or providing the field device with a unique authentic identification feature. The method also includes steps of transmitting ACTUAL identification data to a participant node which transmits the ACTUAL identification data to the other participant nodes in a transaction, validating the transaction by the participant nodes, and creating a data block containing the transaction, wherein the data block is transmitted to each of the participant nodes. The method also includes verifying the data block by all participant nodes, storing the validated data block in the databases, comparing the ACTUAL identification data with corresponding TAR-
(Continued)

GET identification data or original identification data from an authentication point, and generating a response containing the result of the comparison.

15 Claims, 1 Drawing Sheet

(51) Int. Cl.
*H04L 29/08* (2006.01)
*H04W 12/069* (2021.01)

(56) References Cited

U.S. PATENT DOCUMENTS

| | | | |
|---|---|---|---|
| 2013/0060905 A1* | 3/2013 | Mickens | H04L 67/025 709/219 |
| 2016/0063785 A1* | 3/2016 | Benkert | H04W 12/04 340/5.23 |
| 2016/0212146 A1 | 7/2016 | Wilson | |
| 2016/0275461 A1 | 9/2016 | Sprague et al. | |
| 2016/0283920 A1 | 9/2016 | Fisher et al. | |

OTHER PUBLICATIONS

International Search Report for Patent Application No. PCT/EP2017/071539, WIPO, dated Oct. 26, 2017, 13 pp.

Wikipedia, Bitcoin, https://de.wikipedia.org/wiki/Bitcoin?oldid=158290345, 31 pp.

Christidis, Konstantinos and Devetsikiotis, Michael, Blockchains and Smart Contracts for the Internet of Things, Special Section of the Plethora of Research in Internet of Things (Iot), IEEE Access, vol. 4, May 10, 2016 (date of current version Jun. 3, 2016), pp. 2292-2303.

Wikipedia, Ethereum (German language), https://de.wikipedia.org/wiki/Ethereum?oldid=158257943, 4 pp.

Wikipedia, Full Node, https://en.bitcoin.it/w/index.php?title=Full_node&oldid=61480, 4 pp.

Wikipedia, Internet of things, https://en.wikipedia.org/wiki/Internet_of_things?oldid=741724853, 21 pp.

Lee, Boohyung and Lee, Jong-Hyouk, Blockchain-based secure firmware update for embedded devices in an Internet of Things environment, J. Supercomput (2017) 73:1152-1167, Sep. 13, 2016, 16 pp.

\* cited by examiner

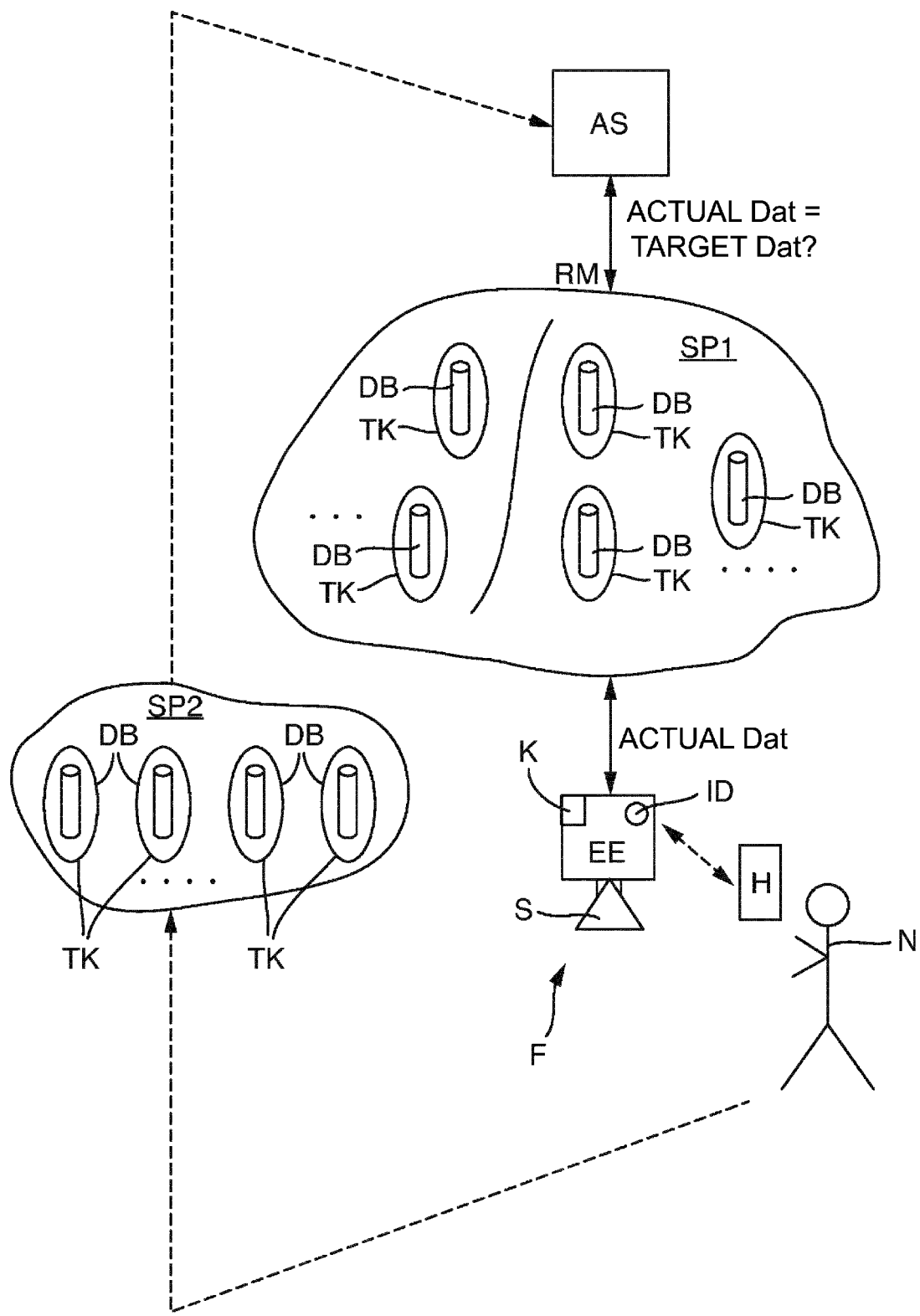

METHOD FOR ENSURING THE AUTHENTICITY OF A FIELD DEVICE

The invention relates to a method for ensuring the authenticity of a field device in automation technology, or at least of a component of a field device that is critical to the function of the field device, wherein the field device has a sensor and/or actuator and an electronic unit, and wherein the field device is integrated into a service platform or can be connected to a service platform.

In automation systems, in particular in process automation systems, field devices serving to capture and/or modify process variables are used in many instances. Sensors are used for recording the process variables, which sensors are, for example, integrated into fill level measuring devices, flow meters, pressure and temperature measuring devices, pH redox potential meters, conductivity meters, etc. which record the corresponding process variables of fill level, flow, pressure, temperature, pH, and conductivity. Actuators, such as, for example, valves or pumps, are used to influence process variables. The flow rate of a fluid in a pipeline section or a filling level in a container can thus be altered by means of actuators. Field devices, in general, refer to all devices which are process-oriented and which supply or process process-relevant information. In the context of the invention, also to be understood as field devices are thus remote I/Os, radio adapters, or general devices that are arranged at the field level. A variety of such field devices are manufactured and marketed by the Endress+Hauser company. The field devices are usually connected to a field bus, and the communication among the field devices and/or with a superordinate unit takes place via at least one of the field bus protocols that is customary in automation technology. Furthermore, it has become known that field devices are designed to be Internet-capable.

If an unauthorized intervention in a field device is performed—the field device is accordingly manipulated—this may lead to significant disadvantages for the operator of a process plant. In the worst case, manipulation of a field device leads to failure of production in the process plant, and/or to damage to persons and property.

Typical examples of manipulations of field devices are:
the firmware of the field device is manipulated by an unauthorized intervention, which leads to generation of faulty measured values. Due to the manipulation, the culprit gains a monetary advantage because, according to measured values, a smaller amount of a product is indicated than is in fact and truth supplied to a customer.
a replacement part is not an original replacement part of the device manufacturer, but rather a cheap, counterfeit replacement part that does not satisfy the manufacturers specifications and, for example, fails when used in a process plant. In applications that require a high degree of security, a defect caused by material or production errors in the field device represents a high risk.

In order to ensure that the firmware of a field device is not manipulated, it has already become known to associate a checksum with the firmware, which checksum is based on CRC32 (CRC: cyclic redundancy check). This is a code which is capable of detecting changes in data. What is understood by firmware is the software that is embedded in electronic devices. It is usually stored in a flash memory, an EPROM, EEPROM, or ROM, and cannot be replaced by the user, or can be replaced only with special means or functions. The term is derived from the fact that firmware is functionally fixed to the hardware. The hardware is not meaningfully usable without the firmware. The firmware has an intermediate position between hardware and the application software, i.e. the possibly replaceable programs of a field device. Incidentally, the authenticity protection is preferably used in field devices that are capable of being verified. A solution which provides a general manipulation protection for field devices has not previously been made known.

From DE 10 2012 104 400 A1, an electronic module has been made known which can be authenticated without access to a database. The electronic assembly comprises a circuit board with a random pattern arranged on a test field visible from the outside, and a exportable memory, especially a wirelessly exportable memory, on which an image of the random pattern is stored in encrypted digital form. The authentication takes place in that: the image stored in the memory of the electronic module to be authenticated is exported and decrypted by means of an authentication device; a reproduction of the image is compared with the random pattern located on the electronic module to be authenticated, or with a reproduction of said random pattern; and the electronic module is registered as authentic if the comparison yields a match.

Moreover, a method for identifying and/or authenticating is commercially used by the Prooftag company headquartered in Montauban, France. Under the product name BubbleTag, Prooftag markets labels on which are located a bubble pattern formed in a transparent polymer in a visible manner, and an associated recognition code. Each of these bubble patterns is produced in a chaotic manufacturing process and is therefore unique. The actual identification or authentication takes place via a database, accessible on-line worldwide, in which all associated data are stored. This database can be accessed via personal computers or via Internet-capable mobile telephones, for example. For example, smart cards, identification cards, documents, or products may be equipped with the bubble tags. The later identification and/or authentication of an object equipped with such a label takes place in that the associated bubble pattern from the database is queried using the identification code located on the label. The associated bubble pattern is then compared—visually or by machine—with the bubble pattern on the label. For a visual comparison, the associated bubble pattern may be displayed on the querying PC or on the querying mobile telephone and be visually compared with the bubble pattern on the available label. For a machine comparison, a reading device is used which reads the bubble pattern located on the label. The read-in bubble pattern is then automatically compared with the associated bubble pattern stored in the database under the recognition code. In the known solution, it is not taken into account that manipulations or unauthorized accesses may also occur in the transmission of data and information via the Internet.

The invention is based on the object of proposing a method by means of which a manipulation of a field device or of a component of a field device is reliably detected.

The object is achieved by the method described in claim 1, and is described explicitly below. The invention relates to a method for ensuring the authenticity of a field device in automation technology, or at least of a component of a field device (which component is in particular critical to the function of the field device), wherein the field device has a sensor and/or actuator and an electronic unit; wherein the field device is integrated into a first service platform or can be connected to a first service platform; wherein the service platform is operated in a decentralized manner with the aid of a distributed ledger or blockchain technology and is composed of a plurality of participant nodes (TK); wherein at least one database (DB) is respectively integrated into each participant node (TK). The method includes the following method steps:

a unique authentic identification feature is associated with the field device or the component of the field device, or the field device or the component of the field device is intrinsically provided with a unique authentic identification feature, the unique authentic identification feature is determined by a user without manipulating the field device or the component, ACTUAL identification data that represent the identification feature are transmitted to the participant nodes in a transaction, or ACTUAL identification data that represent the identification feature are transmitted to a participant node which transmits the ACTUAL identification data to the other participant nodes in a transaction (in the first instance, it is a participant node that delivers the identification data; in the second instance, it is not a participant node that delivers the identification data), the transaction is validated by the participant nodes, a data block containing at least the one transaction is created if a predetermined number of participant nodes validates the transaction, the created data block is preferably transmitted to all participant nodes, the data block is verified by the participant nodes, wherein the data block is valid if a second predetermined number of participant nodes successfully validates the data block, the validated data block is stored in the databases, the ACTUAL identification data are compared with corresponding TARGET identification data or original identification data from an authentication point, a response containing the result of the comparison is generated for the user.

With the method according to the invention, it is ensured that it is clearly recognized whether the field device or the component of the field device is an original product of the manufacturer or a counterfeit product. The authentication site is therefore preferably the manufacturer of the field device. However, it can just as well be a service provider who is working for the manufacturer or a number of different manufacturers; it can also be a customs authority, for example.

If a component of the field device is at issue, then it is in particular a component that is critical to the functioning of the field device, i.e. a component whose manipulation may lead to a risk. The risk may be that the field device delivers faulty measured values and thus operates incorrectly, or that stability problems occur with the housing or short circuits occur in the electronics. It goes without saying that the aforesaid risks are merely exemplary in nature, and may display very different effects depending on the application.

An essential advantage of the invention is that the identification feature or the identification features may be determined or measured without having to invasively and/or destructively intervene in the field device or the component of the field device. In particular, the method is designed such that the identification feature or the identification features is/are determined visually and/or acoustically and/or electronically and/or radiometrically from outside of the field device or the component of the field device.

The unique, authentic identification feature is in particular a feature that is intrinsically present in the field device or in the component of the field device. The micrograph of a membrane or solder pattern of a circuit board are mentioned as examples. Both authentic identification features can be associated unambiguously with exactly one membrane or one circuit board. It is also possible to use the serial number of the field device. In these instances, a photograph is preferably made of the identification feature.

Furthermore, it may also be an acoustic property of the field device or a component of the field device. Cited here as examples are the resonant frequency of a tuning fork of a vibronic sensor, or the natural frequency of a measuring tube of a Coriolis flowmeter.

Furthermore, it may be an identification feature which is exported electronically; for example, the hash value of the firmware is such a unique identification feature. For example, the hash value may be exported via a smart phone via Bluetooth. Furthermore, it is possible, for example, to provide replacement parts of a manufacturer with a radiometric marker that may still be changed as a function of the series by means of a random generator.

The ACTUAL identification data determined by the component or the field device are made available to an authentication point. Here, by comparison with the stored TARGET identification data of the corresponding identification feature, a check is performed as to whether or not it is the original field device or the original component of the field device. A corresponding message is subsequently transmitted to the user.

The comparison of the identification data is performed either with a central database or by means of decentralized databases.

According to the invention, a first service platform that uses a distributed ledger or a blockchain technology is used for the transmission and storage of the data. The payment for the service features preferably takes place via a second service platform which uses the distributed ledger or blockchain technology. ETHERIUM or BLOCKSTREAM is preferably used in connection with the completion of service agreements and/or payment. Payment preferably takes place via a cryptocurrency, e.g., Bitcoin. Systems that use the blockchain technology are characterized by a high degree of security. A manipulation of the data—here in the transmission path—therefore can be reliably precluded.

As already mentioned, a blockchain consists of a plurality of participant nodes, wherein at least one database is respectively integrated into each participant node. The data and/or the identification data of the field device or the field devices is stored at least in part in the decentralized databases so as to be tamper-proof. In particular, it is provided in this context that computing units/computers of one or more users and/or electronic units of field devices are realized as participant nodes. According to a preferred embodiment of the method according to the invention, it is proposed that a participant node is embodied either as a full node version or as a light node version.

As already stated, it is preferably provided that payment for the rendered service takes place via ETHEREUM or Blockstream. This is also an application of the blockchain technology or the distributed ledger technology. ETHEREUM or Blockstream manage assets and/or regulate the accesses ofor transfers of assets. It is also possible to conclude contracts via the distributed ledger technologies, e.g. using smart contracts, and/or to perform the payment for the data or identification data provided according to the contract.

According to an advantageous embodiment of the method according to the invention, it is provided that the comparison alternatively is also executed directly on a smartphone, a tablet computer, or a portable operating tool, outside of the distributed ledger or the blockchain. For this purpose, the corresponding comparison data or the APPs are provided by the manufacturer or by a service provider upon request, possibly again via the distributed ledger or blockchain.

As already stated above, the hash value of the firmware of the field device is preferably used to check whether it is the original firmware. A hash function (also a variance coefficient function) or a hash value is a representation or a value that maps the input data quantity to a smaller target data quantity, which are known as hash values. Whereas the individual elements of the input data set may have different lengths, the elements of the target data set mostly have a fixed, predetermined length.

The term "hash function" derives from the English verb "to hash", which can be translated as "to scramble". The German name is "Streuwertfunktion". The hash values or variance coefficients are mostly scalar values from a limited subset of the natural numbers. A hash value represents a fingerprint of an input data set, thus uniquely represents a firmware, for example.

In the following, different embodiments are described as to how the identification data may be transmitted in encrypted form via the blockchain. According to an advantageous embodiment of the method according to the invention, the identification data are calculated on the basis of a super hash value. In this case, the super hash value is determined from the hash value of the firmware of the field device and from the identification data of the at least one unique authentic identification feature of the field device or of the component of the field device, incorporating the serial number of the field device or the serial number of the component of the field device, and incorporating a first predetermined algorithm.

An alternative encryption variant provides that a master hash value is calculated from the hash value of the firmware and the serial number of the field device with the assistance of a second predetermined algorithm; the identification data are determined on the basis of the master hash value.

Moreover, it is provided that, as an alternative or in addition to the identification data, data generated by the field devices are also transmitted. For this purpose, the master hash value is computationally linked to the data generated by a selected field device via a third predefined algorithm, so that the data are uniquely identified as data of the selected field device. The data mentioned in connection with the invention are in particular measurement data, control data, status data, diagnostic data, and/or historical data.

Additionally or alternatively, it is proposed that the master hash value is linked to a random sequence of letters or numbers, what is known as a nonce.

The invention is explained in greater detail with reference to the following figure, FIG. 1. FIG. 1 schematically visualized how the method according to the invention works. A unique authentic identification feature ID is associated with the field device F or the component K of the field device F. Alternatively, the field device F or the component K of the field device F is intrinsically provided with a unique authentic identification feature ID.

The unique authentic identification feature ID is determined without manipulating the field device F or the component K. Depending on the identification feature ID that is used, this determination may take place via visual, acoustic, electrical, and/or radiometric recording or measurement. In the present instance, the identification feature ID is recorded by the user N by means of the camera of a smartphone.

The ascertained ACTUAL identification data ACTUAL DAT, which represent the identification feature ID, are compared with corresponding TARGET identification data TARGET DAT, or with original identification data. For this purpose, the ACTUAL identification data ACTUAL DAT are preferably transmitted or provided to an authentication point AS. The authentication point AS generates a feedback RM which contains the result of the comparison. The result is either: It is an original field device F or an original component K of the manufacturer, or it is a counterfeit field device F or a counterfeit component K of a field device F.

The distributed ledger or the blockchain BC technology is used for transmitting the data. A blockchain BC is understood to mean a distributed database DB with many participant nodes TK, wherein each participant node TK contains an extensible list of data/data sets. The blockchain BC itself consists of a series of data blocks, in which respectively one or more transactions are combined and provided with a checksum. Each transaction contains at least a part of a data set, here preferably the ACTUAL identification data of the field device F. The integrity of the data, that is to say the securing of the data against subsequent manipulations, is secured by storing the cryptographic checksum of the preceding data block in the respective subsequent data block. New data blocks are created in a computationally intensive process called mining. For this purpose, the participant nodes TK are at least partially equipped with a corresponding computing unit. The data block is then subsequently transmitted to all participant nodes TK. Data DAT that are stored in the blockchain BC can subsequently no longer be changed or removed.

A blockchain BC can be described in somewhat more detail as follows: In each computing unit that is designed as a participant node, a transaction is respectively created based on the generated data DAT. In addition to the data DAT of the field device 1, each transaction usually also additionally contains a corresponding time stamp and/or corresponding location information. Each created transaction is validated at least by a first defined number of interconnected participant nodes TK. At predetermined time intervals, at least one validated transaction is processed by at least one participant node TK to form a data block. This data block is usually transmitted to all participant nodes TK integrated into the service platform SP1. Each data block is stored in decentralized, distributed databases DB as soon as the data of the data block are verified by at least a second defined number of participant nodes TK of the service platform SP1. Via this use of the blockchain technology, the necessary data security may be offered to a user N who usually would like to know with certainty that no unauthorized person has unauthorized access to the data DAT from his process (production process, filling process, manufacturing process, etc.).

Depicted in FIG. 1 is the instance in which the field device F and/or the authentication point AS are/is not a participant node TK of the first service platform SP1. Of course, the field device F might also be designed as a participant node TK of the blockchain. The same also applies to the authentication point AS.

In order to be able to perform the authenticity check, the user N presents a corresponding request (order) to the authentication point AS. However, it is also possible for the user N to conclude a contract with the service provider with regard to a flat rate and be able to use the service on an ongoing basis. The access to the service and the corresponding payment for access to the service are regulated in the contract. The order preferably takes place via the Internet. The creation of a contract may also take place via the Internet.

However, the user N preferably contacts the second service platform SP2, which is likewise based on the blockchain technology; selects from corresponding contract variants the variant that is suitable for his wishes; and concludes the contract with acceptance of the corresponding payment obligation. The service platform SP2 is thus able to reproduce and/or review the contract. At least, it is designed in such a way that the processing of the contract is supported.

According to the agreements established in the contract, or according to the order, the user N is provided with the feedback RM about the authenticity of the field device F or of the component K of the field device F. Afterward or in advance, the payment for the provided information takes place by the payment modalities defined in the contract.

Of course, the order and/or the finalization of a contract, as well as the payment, may also take place entirely conventionally via e-mail, mail, or a bank B.

The invention claimed is:

1. A method for ensuring the authenticity of a field device or component thereof in an automation technology comprises:
   including a sensor or an actuator and an electronic unit in the field device;
   integrating or connecting the field device into a first service platform;
   operating the first service platform in a decentralized manner using a distributed ledger or a blockchain technology, wherein the first service platform is composed of a plurality of participant nodes;
   integrating at least one database into each participant node;
   associating a unique authentic identification feature with the field device or the component of the field device, or providing the field device or the component of the field device with a unique authentic identification feature;
   determining the unique authentic identification feature without manipulating the field device or the component of the field device, wherein manipulating includes causing the field device to deviate from specifications of a manufacturer of the field device;
   transmitting actual identification data that represent the unique authentic identification feature to the participant nodes in a transaction, or transmitting actual identification data that represent the unique authentic identification feature to a participant node which transmits the actual identification data to the other participant nodes in a transaction;
   validating the transaction by the participant nodes;
   creating a data block containing the transaction when a predetermined number of participant nodes validate the transaction;
   transmitting the created data block to the participant nodes;
   verifying the data block by the participant nodes, wherein the data block is valid when a second predetermined number of the participant nodes validates the data block;
   storing the validated data block in the databases;
   comparing the actual identification data with corresponding target identification data or original identification data by an authentication point; and
   generating a response containing a result, wherein the first service platform detects manipulations of field devices, and wherein manipulations include changes that cause the field device to deviate from specifications of a manufacturer of the field device.

2. The method of claim 1, wherein the identification data are determined visually, and/or acoustically, and/or electronically, and/or radiometrically.

3. The method of claim 1, wherein a hash value of a firmware associated with the field device is used as the unique authentic identification feature.

4. The method of claim 1, wherein comparing the ACTUAL identification data with the TARGET identification data is performed using a central database or decentrally arranged databases.

5. The method of claim 4, wherein the database or the databases is or are provided by a service provider.

6. The method of claim 1, wherein the participant nodes are field devices.

7. The method of claim 1, wherein the participant nodes are full node versions or light node versions.

8. The method of claim 1, further including a second service platform operated decentrally using a distributed ledger or blockchain technology for finalizing service contracts or for payment of service costs.

9. The method of claim 8, wherein ETHEREUM or Blockstream is used for the second service platform.

10. The method of claim 8, wherein service costs are paid using cryptocurrency.

11. The method of claim 4, wherein the comparison of ACTUAL identification data with the TARGET identification data is executed on a smart phone, a tablet computer, or a portable operating tool.

12. The method of claim 3, wherein the ACTUAL identification data are calculated based on a super hash value, wherein the super hash value is determined from the hash value of the firmware of the field device and from the identification data of the at least one unique authentic identification feature of the field device or of the component of the field device, incorporating the serial number of the field device, and incorporating a first predetermined algorithm.

13. The method of claim 12, wherein a master hash value is calculated from the hash value of the firmware and the serial number of the field device with the assistance of a second predetermined algorithm, wherein the identification data are determined based on the master hash value.

14. The method of claim 13, wherein the master hash value is computationally linked to the data generated by a selected field device via a third predefined algorithm, so that the data are uniquely identified as data of the selected field device, wherein the data generated by the selected field device includes measurement data, control data, status data, diagnostic data, and/or historical data.

15. The method of claim 14, wherein the master hash value is linked to a nonce.

* * * * *